(12) United States Patent
Nimmagadda et al.

(10) Patent No.: US 10,536,375 B2
(45) Date of Patent: Jan. 14, 2020

(54) INDIVIDUAL NETWORK DEVICE FORWARDING PLANE RESET

(71) Applicant: Juniper Networks, Inc., Sunnyvale, CA (US)

(72) Inventors: Surya Chandra Sekhar Nimmagadda, San Ramon, CA (US); Nayan S. Patel, Bedford, MA (US); Swamy Sadashivaiah Renu Kananda, Sunnyvale, CA (US); Scott Mackie, Santa Cruz, CA (US); Nitin Kumar, Fremont, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 78 days.

(21) Appl. No.: 15/870,148

(22) Filed: Jan. 12, 2018

(65) Prior Publication Data

US 2019/0222514 A1 Jul. 18, 2019

(51) Int. Cl.
*H04L 12/28* (2006.01)
*H04L 12/741* (2013.01)
(52) U.S. Cl.
CPC .................. *H04L 45/74* (2013.01)
(58) Field of Classification Search
CPC .......... H04L 45/74; H04L 45/02; H04L 67/42
See application file for complete search history.

(56) References Cited

U.S. PATENT DOCUMENTS

| 6,188,675 | B1 | 2/2001 | Casper |
| 7,215,637 | B1 | 5/2007 | Ferguson et al. |
| 7,990,993 | B1 | 8/2011 | Ghosh et al. |
| 8,806,058 | B1 * | 8/2014 | Mackie ................... H04L 45/00 709/238 |

(Continued)

FOREIGN PATENT DOCUMENTS

| EP | 3057265 A1 | 2/2015 |
| WO | 2016/125116 A1 | 8/2016 |

OTHER PUBLICATIONS

Diego (Towards secure and dependable software-defined networks, Aug. 16, 2013) (Year: 2013).*

(Continued)

*Primary Examiner* — Maharishi V Khirodhar
(74) *Attorney, Agent, or Firm* — Shumaker & Sieffert, P.A.

(57) ABSTRACT

In one example, a method includes detecting, by a forwarding manager for an internal forwarding path executed by at least one packet processor of a forwarding unit of a network device, that the at least one packet processor of a plurality of packet processors has become available for processing packets for forwarding; in response to the detecting, ceasing, by the forwarding manager, execution of control processing operations received from a control unit of the network device; and programming, by the forwarding manager, a plurality of forwarding path elements of the at least one packet processor based on a dependencies data structure, wherein the dependencies data structure comprises one or (Continued)

more dependencies that each indicates, for a node of a plurality of nodes, one or more nodes that reference the node, and wherein each node of the plurality of nodes corresponds to a single forwarding path element of the plurality of forwarding path elements.

20 Claims, 6 Drawing Sheets

(56) References Cited

U.S. PATENT DOCUMENTS

| | | | | |
|---|---|---|---|---|
| 9,843,624 | B1* | 12/2017 | Taaghol | H04L 67/10 |
| 9,860,168 | B1 | 1/2018 | Seshadri | |
| 2008/0044181 | A1 | 2/2008 | Sindhu | |
| 2008/0151893 | A1* | 6/2008 | Nordmark | H04L 45/00 |
| | | | | 370/392 |
| 2013/0163475 | A1 | 6/2013 | Beliveau et al. | |
| 2013/0223442 | A1* | 8/2013 | Narayanan | H04L 45/64 |
| | | | | 370/389 |
| 2015/0195162 | A1* | 7/2015 | Gandham | H04L 41/04 |
| | | | | 709/206 |
| 2016/0006799 | A1* | 1/2016 | Khandelwal | H04L 41/20 |
| | | | | 709/226 |
| 2016/0182542 | A1* | 6/2016 | Staniford | H04L 63/1416 |
| | | | | 726/23 |
| 2017/0142031 | A1* | 5/2017 | Mackie | H04L 49/30 |

OTHER PUBLICATIONS

U.S. Appl. No. 15/870,309, by Juniper Networks, Inc., (Inventors: Kananda et al.), filed Jan. 12, 2018.
Office Action from U.S. Appl. No. 15/870,309, dated Mar. 12, 2019, 13 pp.
Notice of Allowance from U.S. Appl. No. 15/870,309, dated Jun. 25, 2019, 8 pp.
Extended Search Report from counterpart European Application No. 18203653.3, dated May 15, 2019, 8 pp.
Response to the Office Action dated Mar. 12, 2019, from U.S. Appl. No. 15/870,309, filed Jun. 12, 2019, 9 pp.

* cited by examiner

INDIVIDUAL NETWORK DEVICE FORWARDING PLANE RESET

TECHNICAL FIELD

The disclosure relates to packet-based computer networks and, more particularly, to processing packets within network devices.

BACKGROUND

A computer network is a collection of interconnected computing devices that can exchange data and share resources. Example network devices include layer two devices that operate within the second layer of the Open Systems Interconnection (OSI) reference model, i.e., the data link layer, and layer three devices that operate within the third layer of the OSI reference model, i.e., the network layer. Network devices within computer networks often include a control unit that provides control plane functionality for the network device and one or more forwarding units for routing or switching data units, e.g., packets. In some cases, for example, a network device may include a plurality of packet processors and a switch fabric that collectively provide a forwarding plane for forwarding network traffic.

The control plane functionality provided by the network device include storing network topologies in the form of a routing information base (RIB), executing routing protocols to communicate with peer routing devices to maintain and update the RIB, and providing a management interface to allow user access and configuration of the network device. The control unit maintains routing information that represents the overall topology of the network and defines routes to destination prefixes within the network.

The control unit derives a forwarding information base (FIB) that defines forwarding path elements for packet lookup and other processing operations to be performed by the forwarding units, the FIB being generated by the control unit in accordance with the routing information and control information. The control unit installs the FIB within the forwarding plane to programmatically configure the forwarding units. The representation of the FIB stored to forwarding units may be referred to as the hardware FIB.

The data and instructions that constitute the forwarding path elements may be connected and arranged into a forwarding topology that defines an internal forwarding path for each incoming packet received by the network device. For example, to generate a route table lookup forwarding path element, the control unit selects routes defined by the network topology and maps packet key information (e.g., destination information and other select information from a packet header) to one or more specific next hop network devices and ultimately to one or more specific output interfaces of interface cards of the network device. In some cases, the control unit may install the forwarding path element into each of the forwarding units to update the FIB within each of the forwarding units and control traffic forwarding within the forwarding plane. For a given packet, a forwarding unit executes the forwarding path elements as defined by the internal forwarding path of the forwarding unit for the packet to perform the actions defined and configured by the control unit within the forwarding unit. Bifurcating control and forwarding plane functionality allows the FIB in each of forwarding units to be updated without degrading packet forwarding performance of the network device.

SUMMARY

In general, the disclosure describes techniques for facilitating resetting a network device forwarding plane following an event in which a packet processor of the network device goes "offline." For example, a network device may be configured with a control unit, and the control unit may provide a control plane counterpart to a plurality of forwarding planes (e.g., forwarding units) of the network device. Each forwarding unit may include one or more packet processors, and each packet processor may include one or more forwarding paths. The forwarding paths may each include a series of instructions (e.g., elements) which are configured to direct a packet from a point of ingress of the network device to a point of egress from the network device, allowing the network device to forward the packet toward its destination.

Each forwarding unit may include a forwarding manager. Forwarding path elements of each forwarding path may correspond to one or more "nodes" of the control processing operations stored in the forwarding manager. The forwarding manager may be configured to maintain a dependencies data structure corresponding to the node dependency of its respective forwarding path, and the dependencies data structure may be updated in real time throughout the life of the network device. In response to detecting that a packet processor has come online, the forwarding manager programs forwarding path elements for the packet processor based on the dependencies data structure, independent of the control plane and without disrupting current forwarding operation of other online packet processors. In some examples, the forwarding manager programs forwarding path elements according to the dependencies data structure from an egress point in the forwarding path to an ingress point in the forwarding path.

The described techniques may provide one or more advantages. For example, the dependencies data structure may enable an individual packet processor to be programmed independently of other packet processors in the network device, since the node dependency of each individual forwarding path is recorded in the dependencies data structure. Furthermore, the node infrastructure of the forwarding manager may allow the network device to be programmed especially efficiently, as certain sections of the forwarding software may be used by multiple packet processors at once, and individual forwarding paths may be actively programmed to depend on a custom set of nodes.

Moreover, if a packet processor goes offline for a period of time before returning to an online state, using the dependencies data structure may provide the ability to efficiently reprogram the forwarding path elements of the newly online packet processor without having to reprogram the forwarding path elements from scratch. The server may be configured to sequentially program each forwarding path element of the packet processor from the point of egress of the packet processor to the point of ingress of the packet processor based on the dependencies data structure. The programming process is performed by the server of the forwarding manager, and without input from a client of the forwarding manager. The client may be configured to receive control processing operations from the control unit of the network device. Therefore, programming of the forwarding path elements may be performed entirely within the forwarding unit, without communication with the control unit.

Since the client is not involved in actively maintaining the dependencies data structure, the client may function normally as the server facilitates the reprogramming of the packet processor using the dependencies data structure. During the reprogramming process, the server may cease processing the control processing operations from the client. This ensures that the function of the entire network device is not disrupted while one or more packet processors is being programmed. This feature may serve to isolate the problem of a packet processor going offline to a single forwarding unit, rather than allowing the problem to affect the entire network device, which may be especially beneficial in a network device having many packet processors.

In an example, a method includes detecting, by a forwarding manager for an internal forwarding path executed by at least one packet processor of a forwarding unit of a network device, that the at least one packet processor of a plurality of packet processors has become available for processing packets for forwarding, and in response to the detecting, ceasing, by the forwarding manager, execution of control processing operations received from a control unit of the network device. The method further includes programming, by the forwarding manager, a plurality of forwarding path elements of the at least one packet processor based on a dependencies data structure, wherein the dependencies data structure includes one or more dependencies that each indicates, for a node of a plurality of nodes, one or more nodes that reference the node, and wherein each node of the plurality of nodes corresponds to a single forwarding path element of the plurality of forwarding path elements. Subsequent to programming the plurality of forwarding path elements of the at least one packet processor, the method includes resuming, by the forwarding manager, execution of the control processing operations received from the control unit of the network device.

In another example, a network device includes a control unit and a forwarding unit of a plurality of forwarding units including a forwarding manager and a packet processor, wherein the packet processor includes a plurality of forwarding path elements. The forwarding manager is configured to detect that the packet processor has become available for processing packets for forwarding and cease execution of control processing operations received from the control unit in response to detecting that the packet processor has become available for processing packets for forwarding. The forwarding manager is further configured to program the plurality of forwarding path elements of the packet processor based on a dependencies data structure, wherein the dependencies data structure includes one or more dependencies that each indicates, for a node of a plurality of nodes, one or more nodes that reference the node, and wherein each node of the plurality of nodes corresponds to a single forwarding path element of the plurality of forwarding path elements; and subsequent to programming the plurality of forwarding path elements of the packet processor, resume execution of the control processing operations received from the control unit of the network device.

In another example, a non-transitory computer-readable medium includes instructions for causing one or more programmable processors of a network device to detect, by a forwarding manager for an internal forwarding path executed by at least one packet processor of a forwarding unit of the network device, that the at least one packet processor of a plurality of packet processors has become available for processing packets for forwarding; in response to detecting that the at least one packet processor has become available for processing packets for forwarding, cease, by the forwarding manager, execution of control processing operations received from a control unit of the network device; program, by the forwarding manager, a plurality of forwarding path elements of the at least one packet processor based on a dependencies data structure, wherein the dependencies data structure includes one or more dependencies that each indicates, for a node of a plurality of nodes, one or more nodes that reference the node, and wherein each node of the plurality of nodes corresponds to a single forwarding path element of the plurality of forwarding path elements; and subsequent to programming the plurality of forwarding path elements of the packet processor, resume, by the forwarding manager, execution of the control processing operations received from the control unit of the network device.

The details of one or more aspects of the disclosure are set forth in the accompanying drawings and the description below. Other features, objects, and advantages of the techniques described in this disclosure will be apparent from the description, drawings, and claims.

BRIEF DESCRIPTION OF DRAWINGS

Like reference characters denote like elements throughout the figures and text.

DETAILED DESCRIPTION

The techniques described in this disclosure may use information generated in a network device in ways that are beneficial to the function of the network device. For example, a packet processor driver of the network device configures a forwarding path in response to receiving instructions from control plane applications and exposes a forwarding manager that offers control processing operations for the forwarding path. The forwarding manager allows the network device to configure the overall forwarding path. To operate effectively, the elements of each forwarding path may correspond to one or more "nodes" of the control processing operations in the forwarding manager.

For example, each forwarding path element may correspond to a single node of a plurality of nodes. Forwarding path elements of a plurality of forwarding paths may be codependent on a common node, and a forwarding path element of an individual forwarding path may be dependent on an exclusive node. Thus, many individual forwarding paths may be dependent on a plurality of common nodes as well as a plurality of exclusive nodes. The node dependency of the forwarding path may change over time, and the forwarding path may be dependent on a greater number of common nodes than exclusive nodes. This may result in a network device including many forwarding paths with unique functions.

The forwarding manager may be configured to communicate with the packet processor. The packet processor may be configured to access data stored in the forwarding manager. The node dependency of each forwarding path may be recorded and stored in the forwarding manager, in the form of a structure called a "dependencies data structure." Each forwarding unit may be configured to maintain a dependencies data structure corresponding to the node dependency of its respective forwarding path, and the dependencies data structure may be updated in real time throughout the life of the network device. Since each forwarding path element of the plurality of forwarding path elements may correspond to a single node of the plurality of nodes, the dependencies data structure may reflect the dependencies of the forwarding path elements, as well as the dependencies of the nodes. The forwarding manager may be configured to store the dependencies data structure in a server, and the server may be responsible for maintaining the dependencies data structure. In response to detecting that a packet processor has come online, the forwarding manager programs forwarding path elements for the packet processor based on the dependencies data structure, independent of the control plane and without disrupting current forwarding operation of other online packet processors. In some examples, the forwarding manager programs forwarding path elements for nodes that are common across multiple packet processors.

In this manner, the nodes and the dependencies data structures may provide useful information aiding in the efficient operation of the network device. Some applications of the nodes and the dependencies data structures are described below.

Figure 1:
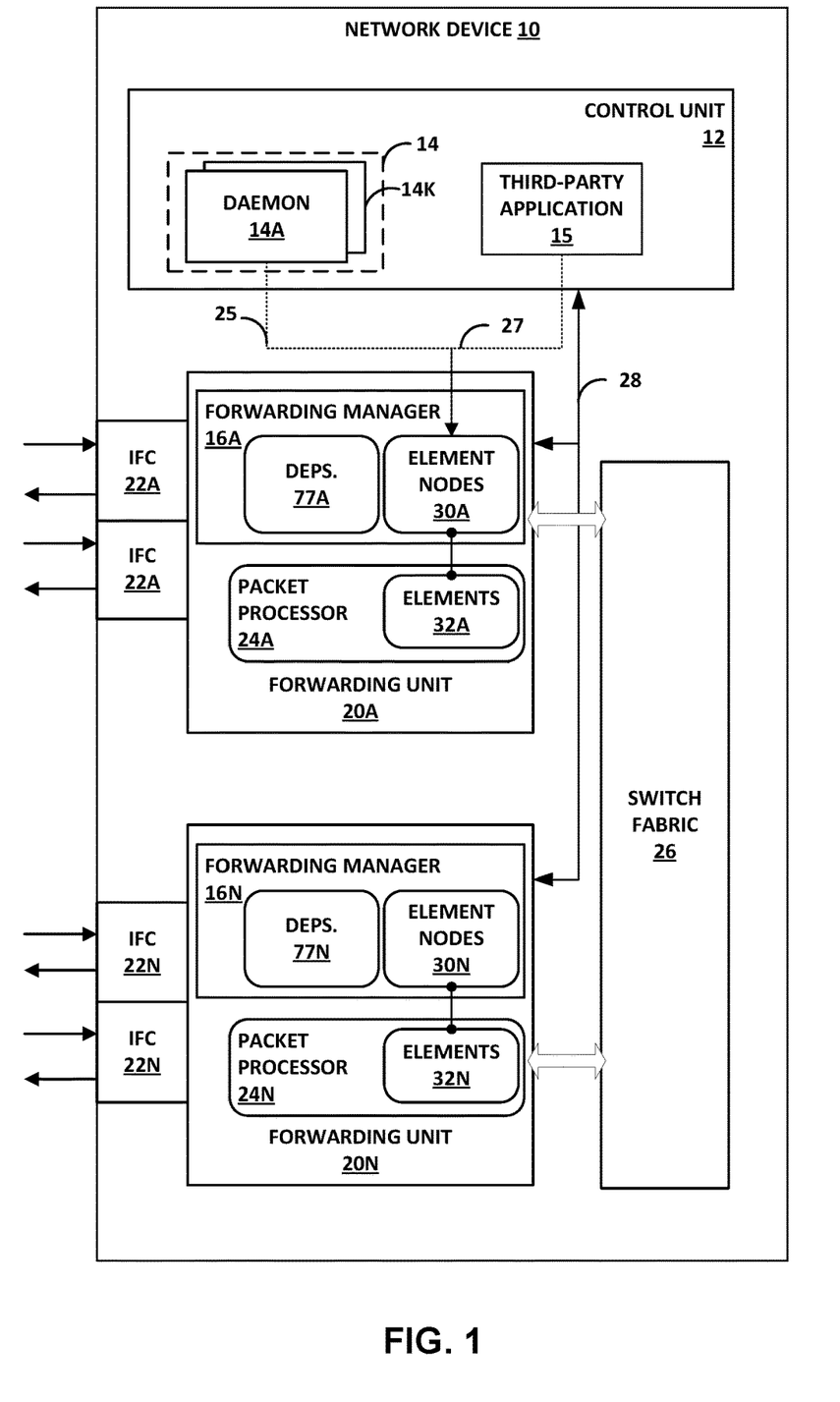
FIG. 1 is a block diagram illustrating an example network device in which one or more forwarding units are configured, according to techniques described herein.

FIG. 1 is a block diagram illustrating an example network device in which one or more forwarding units are configured, according to techniques described herein. Network device 10 may include a router such as a provider edge or customer edge router, a core router, or another type of network device, such as a switch. In this example, network device 10 includes a control unit 12 that provides control plane functionality for the device. Network device 10 also includes a plurality of forwarding units 20A-20N ("forwarding units 20") and a switch fabric 26 that together provide a data plane for processing network traffic. Forwarding units 20 receive and send data packets via interfaces of interface cards 22A-22N ("IFCs 22") each associated with a respective one of forwarding units 20. Each of forwarding units 20 and its associated ones of IFCs 22 may represent a separate line card insertable within a chassis (not shown) of network device 10. Example line cards include flexible programmable integrated circuit (PIC) concentrators (FPCs), dense port concentrators (DPCs), and modular port concentrators (MPCs). Each of IFCs 22 may include interfaces for various combinations of layer two (L2) technologies, including Ethernet, Gigabit Ethernet (GigE), and Synchronous Optical Networking (SONET) interfaces, that provide an L2 interface for transporting network packets. In various aspects, each of forwarding units 20 may include more or fewer IFCs. Switch fabric 26 provides a high-speed interconnect among forwarding units 20 for forwarding incoming data packets to an egress forwarding unit of forwarding units 20 for output over a network that includes network device 10.

Control unit 12 is connected to each of forwarding units 20 by internal communication links 28. Internal communication links 28 may include a 100 Mbps Ethernet connection, for instance. Control unit 12 configures, by sending instructions and other configuration data via internal communication link 28, forwarding units 20 to define control processing operations applied to packets received by forwarding units 20.

Control unit 12 executes a plurality of applications, including daemons 14A-14K ("daemons 14") and one or more third-party applications 15. Each of the applications may represent a separate process managed by a control unit operating system. Daemons 14 may represent user-level processes that are developed and deployed by the manufacturer of the network device 10. As such, daemons 14 are "native" to the network device 10 in that the development of the applications is carefully managed by the manufacturer to facilitate secure, robust, and predictable operation of the network device 10, such operation defined at least in part according to a configuration specified by an operator (e.g., a service provider, enterprise, or other customer of the network device 10 manufacturer). Daemons 14 may run network management software, execute routing protocols to communicate with peer routing devices, maintain and update one or more routing tables, and create one or more forwarding tables for installation to forwarding units 20, among other functions.

Third-party application 15 represents an application. The "third-party" typically is an operator of the network device 10 and is not the manufacturer of the network device 10. However, application 15 need not necessarily be developed by a third party and may in some cases be, e.g., an application developed by the manufacturer of the network device 10. In some cases, third-party application 15 presents an external application programming interface (API) by which external controllers, such as software-defined networking controllers and network management systems, may send data representing control processing operations to be performed by forwarding units 20. In such cases, third-party application 15 operates as an interface to the network device 10 data plane for the external controllers.

Control unit 12 may include one or more processors (not shown in FIG. 1) that execute software instructions, such as those used to define a software or computer program, stored to a computer-readable storage medium (again, not shown in FIG. 1), such as non-transitory computer-readable mediums including a storage device (e.g., a disk drive, or an optical drive) and/or a memory such as random-access memory (RAM) (including various forms of dynamic RAM (DRAM), e.g., DDR2 SDRAM, or static RAM (SRAM)), Flash memory, another form of fixed or removable storage medium that can be used to carry or store desired program code and program data in the form of instructions or data structures and that can be accessed by a processor, or any other type of volatile or non-volatile memory that stores instructions to cause the one or more processors to perform techniques described herein. Alternatively, or in addition, control unit 12 may include dedicated hardware, such as one or more integrated circuits, one or more Application Specific Integrated Circuits (ASICs), one or more Application Specific Special Processors (ASSPs), one or more Field Programmable Gate Arrays (FPGAs), or any combination of one or more of the foregoing examples of dedicated hardware, for performing the techniques described herein.

Each forwarding unit of forwarding units 20 includes at least one packet processor 24 that processes packets by performing a series of operations on each packet over respective internal packet forwarding paths as the packets traverse the internal architecture of network device 10. Packet processor 24A of forwarding unit 20A, for instance, includes one or more configurable hardware chips (e.g., a chipset) that, when configured by applications executing on control unit 12, define the operations to be performed by packets received by forwarding unit 20. Each chipset may in some examples represent a "packet forwarding engine" (PFE). Each chipset may include different chips each having a specialized function, such as queuing, buffering, interfacing, and lookup/packet processing. Each of the chips may represent application specific integrated circuit (ASIC)-based, field programmable gate array (FPGA)-based, or other programmable hardware logic. A single forwarding unit 20 may include one or more packet processors 24.

Operations may be performed, for example, on each packet by any of a corresponding ingress interface, an ingress forwarding unit 20, an egress forwarding unit 20, an egress interface or other components of network device 10 to which the packet is directed prior to egress, such as one or more service cards. Packet processors 24 process packets to identify packet properties and perform actions bound to the properties. Each of packet processors 24 includes forwarding path elements that, when executed, cause the packet processor to examine the contents of each packet (or another packet property, e.g., incoming interface) and on that basis make forwarding decisions, apply filters, and/or perform accounting, management, traffic analysis, and load balancing, for example. In one example, each of packet processors 24 arranges forwarding path elements as next hop data that can be chained together as a series of "hops" in a forwarding topology along an internal packet forwarding path for the network device. The result of packet processing determines the manner in which a packet is forwarded or otherwise processed by packet processors 24 of forwarding units 20 from its input interface on one of IFCs 22 to, at least in some cases, its output interface on one of IFCs 22.

In many instances, the forwarding path elements perform lookup operations, such as a tree (or trie) search, a table (or index) search, a filter determination and application, or a rate limiter determination and application. Lookup operations locate, within a lookup data structure (e.g., a lookup tree), an item that matches packet contents or another property of the packet or packet flow, such as the inbound interface of the packet.

Applications configured for execution by control unit 12 determine the control processing operations to be applied to packets by packet processors 24. In the example network device of FIG. 1, applications include daemons 14 and third-party application 15. Applications configure the packet processors 24 to perform the control processing operations by sending, to forwarding units 20, data representing the control processing operations. Such data may include forwarding path elements representing high-level packet processing requirements (e.g., route lookup and filtering). Control processing operations may include fundamental packet forwarding operations such as input packet processing, route lookup, and output packet processing, as well as service functions such as packet filtering or access control, statistical sampling, traffic policing, rate limiting, and accounting.

Forwarding units 20 include respective forwarding managers 16 that translate the data representing the control processing operations received from applications into forwarding path elements 32 (which may include forwarding "next hops" and hereinafter referred to as forwarding path elements) that include instructions executable by respective packet processors 24 and stores the forwarding path elements 32 to memory of packet processors 24 (not shown in FIG. 1). Each of forwarding manager 16 may represent executable instructions, such as instructions for a process. Packet processors 24 execute the forwarding path elements 32 to process received packets to satisfy the high-level packet processing requirements provided by the application. In this way, the applications inject higher-level representations of routes and next-hops (operations) into the stream of configurable forwarding state that is stored by packet processors and that defines, at least in part, the control processing operations for execution by packet processors 24. Because forwarding path elements 32 may resolve to other forwarding path elements 32, forwarding path elements 32 may be chained together to define a set of control processing operations for a given packet and form a "forwarding path" for that packet. The set of forwarding path elements 32 and forwarding state for execution and use by packet processors 24 may therefore alternatively be referred to as the forwarding path or internal forwarding path for a given packet processor 24, forwarding unit 20, or the network device 12 as a whole.

In accordance with techniques described in this disclosure, forwarding managers 16 represent forwarding path elements 32 using corresponding element nodes 30 (hereinafter, "nodes 30"). Hereinafter, the techniques are described with respect to forwarding unit 20A. Each node of nodes 30A is a data structure managed by forwarding manager 16A and represents a single forwarding path element 32A for execution by packet processor 24A. A forwarding path element may be of a type to perform a simple action (such as a counter or discard), a conditional, or a complex construct such as a table, tree, or lookup. Nevertheless, forwarding manager 16A uses node instances of the common node data structure to represent and refer to each of the forwarding path elements 32. Each node instance may have a type that corresponds to the type of forwarding path element (e.g., action, tree, etc.)

Each of nodes 30A includes a token that is a unique identifier for a corresponding forwarding path element 32A that uniquely identifies the node within a context for the corresponding forwarding path element 32. The unique identifier may be, e.g., a 64-bit or other n-bit integer value for the token.

Forwarding manager 16A creates dependencies between nodes by referencing the token for the next node in a forwarding topology. For example, forwarding manager 16A may specify a second, next forwarding path element for a first forwarding path element by adding the token of the second, next forwarding path element to a list of next forwarding path elements for the first forwarding path element. This inherent token referencing allows connections between nodes to be easily abstract and thus more readily manipulated, provides a consistent interface across process and memory boundaries within forwarding manager 16A, and may facilitate multi-threading. Token referencing among nodes 30A may in these ways present one or more advantages over pointer-based schemes in which each forwarding path element is represented and referred to by its location in packet processor 24A memory.

Each node of nodes 30A can have dependencies, which are other nodes 30A that are referred to by the unique tokens of the other nodes 30A. Such dependencies may include not only the next forwarding path elements for the node but also include dependencies that notify forwarding manager 16A that a change in one node or entry may require another node to be updated.

Forwarding managers 16 may be configured to create dependencies data structures 77A-77N ("dependencies 77") which represent the dependencies of each forwarding path element on other forwarding path elements of a plurality of forwarding path elements 32. Forwarding manager 16A may generate dependencies 77A using the list of token references of nodes 30A that specify dependencies for the nodes. Furthermore, the list of token references may be based on the control processing operations received from the control plane 12 via client 63A. For example, control unit 12 may send Forwarding manager 16A a node X that includes forwarding state for an interface. Any node 30A that has a token reference in its list of token references to the token value for node X is dependent on node X. Forwarding manager 16A represents dependencies in the dependencies 77A data structure, such as one or more trees, lists, tables, maps, etc., to enable forwarding manager 16A to more readily and rapidly determine which nodes 30A (and corresponding forwarding path elements 32A) should be updated when another node is modified. Using the above example, dependencies 77A may include a map or other data structure that includes one or more mappings that map node X to all other nodes 30A that have the node X token value in their lists of token references. If node X is subsequently modified, forwarding manager 16A maps node X to those nodes 30A that are dependent on node X using dependencies 77A and updates the forwarding path elements 32A for those nodes 30A. In this way, forwarding manager 16A uses dependencies 77A to propagate changes made to a node 30A to the underlying forwarding topology of forwarding path 66A.

The function of at least one packet processor 24 may cease during the operation of network device 10. For example, a packet may arrive at a point of ingress of packet processor 24A, and the forwarding path elements 32A may be unable to process the packet from the point of ingress of packet processor 24A to the point of egress of packet processor 24A. In this example, packet processor 24A is offline. Packet processor 24A may come back online after it is offline. In this instance, forwarding manager 16A may detect that packet processor 24A is available for processing packets for forwarding, and forwarding manager 16A may program hardware forwarding path elements 32A to restore a functioning forwarding path within packet processor 24A. Forwarding manager 16A may program forwarding path elements 32A with no direction from control unit 12 of network device 10. For instance, forwarding manager 16A may store dependencies data structures 77A, providing a template for programming packet processor 24A without the input of control unit 12.

A programming process may direct the programming of packet processor 24A after packet processor 24A is restored to an online state. Forwarding manager 16A may use dependencies data structure 77A to program forwarding path elements 32A, and the programming may restore packet processor 24A to its function of routing at least one packet from the point of ingress to the point of egress. After packet processor 24A comes back online, forwarding manager 16A may access dependencies data structure 77A, and forwarding manager 16A may program the plurality of forwarding path elements 32A in order from the forwarding path element closest to the point of egress of packet processor 24A to the forwarding path element closest to the point of ingress of packet processor 24A. After forwarding manager 16A programs each hardware forwarding path element of the plurality of forwarding path elements 32A, packet processor 24A may resume processing one or more packets from an point of ingress of packet processor 24A to a point of egress of packet processor 24A.

In some examples, forwarding managers 16 may program multiple packet processors 24 during a period of time. For example, network device 10 may include thirty-two forwarding units 20, each including at least one packet processor 24, and the forwarding units 20 may include separate groups of eight forwarding units 20 each. An administrator of network device 10 may turn off a group of forwarding units 20 for a period of time in the interest of power efficiency. However, after the group of forwarding units 20 is turned back on, forwarding managers 16 must program each packet processor 24 of the group of forwarding units 20 with the appropriate forwarding path elements. In this example, forwarding managers 16 may access dependencies data structures 77 of each forwarding unit 20 to program forwarding path elements 32 in the manner described above with respect to forwarding unit 20A. Forwarding managers 16 may program any number of packet processors 24 without disrupting the function of packet processors that were continuously operating while the group of forwarding units 20 was offline.

Figure 2:
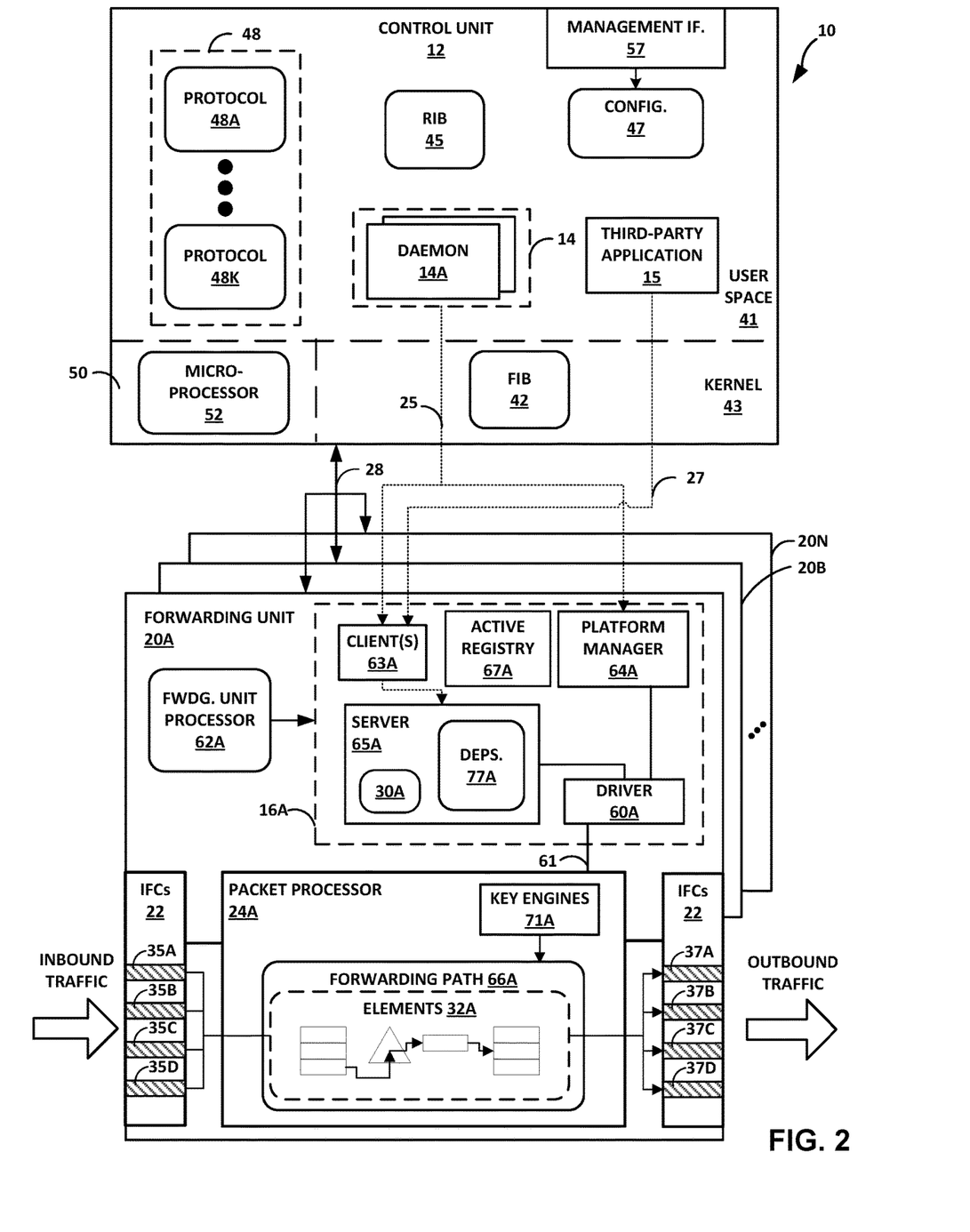
FIG. 2 is a block diagram illustrating an example instance of the network device of FIG. 1 in further detail.

FIG. 2 is a block diagram illustrating, in further detail, an example network device in which a forwarding unit is configured, according to techniques described herein. Network device 10 illustrated in FIG. 2 may represent an example instance of network device 10 of FIG. 1.

In this example, control unit 12 includes a combination of hardware and software that provides a control plane operating environment for execution of various user-level host applications executing in user space 41. By way of example, host applications may include a management interface process 57 having a command-line interface and/or graphical user interface process to receive and respond to administrative directives, a routing protocol process of daemons 14 to execute one or more routing protocols of protocols 48A-48K (collectively, "protocols 48"), a network management process of daemons 14 to execute one or more network management protocols of protocols, an ARP process of daemons 14 to respond to ARP requests according the ARP protocol of protocols 48, a subscriber management process of daemons 14 to manage subscriber session setup and maintenance in accordance with one or more subscriber session management protocols (e.g., GPRS Tunneling Protocol-C (ontrol)), and so forth. In this respect, control unit 12 may provide routing plane, service plane, and management plane functionality for network device 10. Control units 12 may be distributed among multiple control units.

Daemons 14 and management interface 57 execute on and interact with kernel 43, which provides a run-time operating environment for user-level processes. Kernel 43 may represent, for example, a UNIX operating system derivative such as Linux or Berkeley Software Distribution (BSD). Kernel 43 offers libraries and drivers by which user-level processes may interact with the underlying system. Hardware environment 50 of control unit 12 includes microprocessor 52 that executes program instructions loaded into a main memory (not shown in FIG. 2) from a storage device (also not shown in FIG. 2) in order to execute the software stack, including both kernel 43 and user space 41, of control unit 12. Microprocessor 52 may represent one or more general- or special-purpose processors such as a digital signal processor (DSP), an application specific integrated circuit (ASIC), a field programmable gate array (FPGA), or any other equivalent logic device. Accordingly, the terms "processor" or "controller," as used herein, may refer to any one or more of the foregoing structures or any other structure operable to perform techniques described herein.

In this example, a routing protocol process of daemons 14 executes one or more interior and/or exterior routing protocols to exchange routing information with other network devices and store received routing information in routing information base 45 ("RIB 45"). RIB 45 may include information defining a topology of a network, including one or more routing tables and/or link-state databases. The routing protocol process resolves the topology defined by routing information in RIB 45 to select or determine one or more active routes through the network and then installs these routes to forwarding information base 42 ("FIB 42") of kernel 43. Typically, the routing protocol process generates FIB 42 in the form of a radix or other lookup tree to map packet information (e.g., header information having destination information and/or a label stack) to next hop devices and ultimately to interface ports of interface cards associated with respective forwarding units 20A-20N. Each of forwarding units 20 may be programmed with a different FIB.

Network device 10 also includes a plurality of forwarding units 20A-20N (collectively, "forwarding units 20") and a switch fabric (not shown) that together provide a data plane for forwarding network traffic. Forwarding units 20 connect to control unit 12 in this example by communication links 23, which may represent an Ethernet network.

Each of forwarding units 20 may include substantially similar components performing substantially similar functionality, said components and functionality being described hereinafter primarily with respect to forwarding unit 20A illustrated in detail in FIG. 2. Forwarding unit 20A of FIG. 2 may illustrate, in further detail, an example of forwarding unit 20A of FIG. 1. Forwarding unit 20A receives and sends network packets via inbound interfaces 35 and outbound interfaces 37, respectively, of interface cards (IFCs) 22 of forwarding unit 20A. Forwarding unit 20A also includes packet processor 24A, which represents hardware or a combination of hardware and software that provide high-speed forwarding of network traffic. Likewise, forwarding unit 20B includes packet processor 24B, and so on. In some examples, one or more of forwarding units 20 may each include multiple packet processors substantially similar to packet processor 24A.

Each of IFCs 22 may include interfaces for various combinations of layer two (L2) technologies, including Ethernet, Gigabit Ethernet (GigE), and Synchronous Optical Networking (SONET) interfaces. In various aspects, each of forwarding units 20 may include more or fewer IFCs. In some examples, each of packet processors 24 is associated with different IFCs of the forwarding unit on which the packet processor is located. The switch fabric (again, not shown in FIG. 2) connecting forwarding units 20 provides a high-speed interconnect for forwarding incoming transit network packets to the selected one of forwarding units 20 for output over one of IFCs 22.

Network device 10 may in some instances represent a multi-chassis router, and the switch fabric may include a multi-stage switch fabric, such as a 3-stage Clos switch fabric, that relays packet-switched communications and circuit-switched communications between the routing nodes of the multi-chassis router via optical interconnects using multiplexed communications. Such a multi-chassis router that employs optical interconnects using multiplexed communications is described in U.S. Publication No. 2008/0044181, entitled MULTI-CHASSIS ROUTER WITH MULTIPLEXED OPTICAL INTERCONNECTS, filed on Aug. 1, 2007, the entire contents of which are incorporated by reference herein.

Forwarding units 20A-20N of network device 10 demarcate control plane and data plane of network device 10. That is, forwarding unit 20A performs control plane and data plane functionality. In general, packet processor 24A and IFCs 22 implement a data plane for forwarding unit 20A, while forwarding unit processor 62A (illustrated as "fwdg. unit processor 62A") executes software including forwarding manager 16A and packet processor driver 60A that implement portions of the network device 10 control plane within forwarding unit 20A. Control unit 12 also implements portions of the control plane of network device 10. Forwarding unit processor 62A of forwarding unit 20A manages packet processor 24A and executes instructions to provide interfaces to control unit 12 and handle host-bound or other local network packets (such as packets that include Options Field values or TTL-expired packets). Forwarding unit processor 62A may execute a microkernel for forwarding unit 20A. The microkernel executed by forwarding unit processor 62A may provide a multi-threaded execution environment for executing modules of forwarding manager 16A and packet processor driver 60.

Packet processor 24A may include programmable ASIC-based, FPGA-based, or other types of packet processors that process network packets by performing a series of operations on each packet over respective internal packet forwarding paths as the packets traverse the internal architecture of network device 10. Packet processor 24A includes forwarding path elements 32A that, in general, when executed, examine the contents of each packet (or another packet property, e.g., incoming interface) and on that basis make forwarding decisions, apply filters, and/or perform accounting, management, traffic analysis, and load balancing, for example. In one example, packet processor 24A arranges forwarding path elements as next hop data that can be chained together as a series of "next hops" along an internal packet forwarding path 66A ("forwarding path 66A") for the packet processor 24A. The result of packet processing determines the manner in which a packet is forwarded or otherwise processed by packet processors 24 of forwarding units 20 from the packet's input interface on an ingress forwarding unit of forwarding units 20 to its output interface on an egress forwarding unit of forwarding units 20.

Packet processor 24A identifies packet properties and performs actions bound to the properties. One or more key engines 71A of packet processor 24A execute microcode (or "microinstructions") of the forwarding path elements to control and apply fixed hardware components of the forwarding path to process packet "keys." A packet key includes packet fields and other parameters that determine a flow of packet processing for the packet along an internal forwarding path. Internal forwarding path 66A ("forwarding path 66A") may represent a computer-readable storage medium, such as random access memory, and includes forwarding path elements in the form of programmable, executable microcode and fixed hardware components that determine the packet processing actions and other operations performed by packet processor 24A. Forwarding path 66A may include, for example, executable instructions, programmable logic, and application-specific logic that perform lookups, rate limit packet flows (e.g., using policers), and manipulate packet keys, among other functions. Forwarding path elements may include primitives such as lookup tables and lookup trees, along with rate limiters, policers, counters, firewalls, and other elements.

Internal forwarding paths of network device 10 may include combinations of respective forwarding paths 66 of multiple different packet processors 24. In other words, forwarding path 66A of packet processor 24A may include only a part of the overall internal forwarding path of network device 10. Control unit 12 may configure forwarding path 66A of packet processor 24A to identify host-bound network packets and forward such packets toward control unit 12.

For example, control unit 12 may program filters that include a network address of a network device 10 and direct packet processor 24A to forward network packets having a destination address that matches the network address toward control unit 12.

In some examples, packet processor 24A binds actions to be performed on packets received by the packet processor 24A to identification of one or more properties of the packets. That is, upon identifying certain packet properties, packet processor 24A performs the action bound to the properties. Packet properties may include packet metadata such as a particular packet's ingress interface or egress interface (as determined by the packet processors 24) as well as information carried by the packet and packet header, such as packet header fields, destination route prefixes, layer four (L4) or Transport Layer protocol destination ports, and the packet payload. Actions bound to packet characteristics may include count, discard, forward to a specified forwarding path element or interface, filter, sample, rate limit, and Quality of Service (QoS) marking, differential services (DiffServ), load balance, intrusion detection and prevention, L2 class of service (CoS), and L2 or L2 Virtual Private Network (L2VPN) switching.

Each of key engines 71A includes one or more key buffers to store packet field data for corresponding packets that the key engine is currently processing. Key buffers may also provide limited writable memory to which elements of the internal forwarding path may write to pass messages accessible by future elements.

Forwarding path elements 32A (also referred to as "primitives") of forwarding path 66A include data structures having entries, or "items," that correspond to packet key values and bind the values to actions to be performed by key engines 71A executing forwarding path 66A. In this respect, at least some of forwarding path elements 32A represent a tightly-coupled combination of executable instructions that correspond to bound actions and of data for possible packet key values. A tree lookup one of forwarding path elements 32A may perform a longest-match prefix lookup in a routing table or search a list of prefixes in a filter program. A table lookup one of forwarding path elements 32A may determine whether another one of forwarding path elements 32A should be performed by key engines 71A. For example, a key engine 71A may perform a table lookup of packet properties to determine that key engines 71A should further perform a tree lookup to identify an outbound interface for the packet. Packet processor 24A may store forwarding path elements 32A in computer-readable storage media, such as static random access memory (SRAM). While illustrated within packet processor 24A, forwarding path elements 32A may be stored in memory external and accessible to packet processor 24A.

In some aspects, actions of forwarding path 66 use a forwarding path element data structure to initiate processing. At the end of each processing step by one of key engines 71A, such as execution of one of a forwarding path element 32A, the result is a forwarding path element that may specify additional processing or the termination of processing, for instance. In addition, forwarding path elements may specify or otherwise represent one or more functions to be executed by key engines 71A. Example forwarding path element functions include policing (i.e., rate limiting), counting, and sampling. Forwarding path elements thus form the primary data structure that can be used to initiate a lookup or another forwarding path element, chain lookups and forwarding path elements together to allow for multiple lookup and other operations to be performed on a single packet, and terminate a lookup. Key engines 71 may be associated with respective result (or "lookup") buffers that store results for executing forwarding path elements. For example, a key engine 71 may execute a lookup specified by a forwarding path element and store the result of the lookup to the associated result buffer. The contents of a result buffer may affect the actions of the forwarding path element in the forwarding topology.

Additional information regarding forwarding path elements (next hops) and forwarding path element (next hop) chaining is available in PLATFORM-INDEPENDENT CONTROL PLANE AND LOWER-LEVEL DERIVATION OF FORWARDING PATH ELEMENTS, U.S. Pat. No. 7,990,993, issued Aug. 2, 2011, which is incorporated herein by reference in its entirety. Example details of a network router in which a control plane programs a forwarding plane with forwarding path elements are described in U.S. Pat. No. 8,806,058, issued Aug. 12, 2014, and entitled PACKET FORWARDING PATH PROGRAMMING USING A HIGH-LEVEL DESCRIPTION LANGUAGE; and in U.S. Pat. No. 7,215,637, issued May 8, 2007, and entitled SYSTEMS AND METHODS FOR PROCESSING PACKETS, the entire contents of each of which are incorporated herein by reference.

Forwarding unit 20A receives inbound network traffic by IFCs 22, and packet processor 24A processes network traffic using internal forwarding path 66A. Packet processor 24A looks up outbound interfaces for and forwards transit network packets that are neither host-bound nor otherwise require a response of logical decision by the control plane as outbound traffic via outbound interfaces 37. Although described primarily with respect to a single packet processor 24A and a single forwarding path 66A, forwarding manager 16A for forwarding unit 20A may configure multiple packet processors 24 each having a separate and/or shared forwarding path 66.

Forwarding unit 20A executes forwarding manager 16A software and presents interfaces to control unit 12 for configuring forwarding path 66A. One or more clients 63A, server module ("server") 65A, platform manager 64A, and driver 60A may represent different processes executed by forwarding unit processor 62A using, e.g., an operating environment provided by a microkernel (not shown). Server 65A may be multi-threaded to concurrently support communication with multiple clients 63A. Each of clients 63A may communicate with one thread of server 65A to facilitate all operations specified to that client 63A/thread are executed in a sequence.

Server 65A presents an application programming interface (API) to enable clients 63A to create forwarding path elements 32A in forwarding path 66A by creating, referencing, and connecting forwarding path elements 32A using nodes 30A. Server 65A translates nodes 30A received from clients 63A into corresponding forwarding path elements 32A supported by packet processor 24A. Each of forwarding path elements 32A has a corresponding one of nodes 30A stored by server 65A and accessible using the server 65A API. Clients 63A use the API for nodes 30A to create sandboxes (described in further detail below), program entries into lookup-type forwarding path elements 32A, and connect forwarding path elements 32A to program end-to-end forwarding state.

In this way, server 65A implements a stateful translation bridge between clients 63A and the underlying hardware/forwarding path 66A of packet processor 24A. For example, clients 63A send a stream of nodes and entries and server 65A translates the nodes and entries into forwarding path elements 32A for configuring forwarding path 66A. Server 65A also includes data structures for tracking and managing nodes 30A received from the clients 63A, and in this way managing the overall forwarding state as represented in forwarding path 66A. One example such data structure of server 65A, dependencies 77A, is illustrated in FIG. 2.

Server 65A generates dependencies 77A using the list of token references of nodes 30A that specify dependencies for the nodes. For example, a client 63A may send server 65A a node X that includes forwarding state for an interface. Any node 30A that has a token reference in its list of token references to the token value for node X is dependent on node X. Server 65A represents dependencies in the dependencies 77A data structure, such as one or more trees, lists, tables, maps, etc., to enable server 65A to more readily and rapidly determine which nodes 30A (and corresponding forwarding path elements 32A) should be updated when another node is modified. Using the above example, dependencies 77A may include a map or other data structure that includes one or more mappings that map node X to all other nodes 30A that have the node X token value in their lists of token references. If node X is subsequently modified, server 65A maps node X to those nodes 30A that are dependent on node X using dependencies 77A and updates the forwarding path elements 32A for those nodes 30A. In this way, server 65A uses dependencies 77A to propagate changes made to a node 30A to the underlying forwarding topology of forwarding path 66A.

Packet processor driver 60A (hereinafter, "driver 60A"), configured for execution by forwarding unit processor 62A, configures forwarding path 66A with forwarding path elements 32A for execution by packet processor 24A. Packet processor driver 60A receives forwarding path elements 32A from server 65A and platform manager 64A. Forwarding path elements 32A may include instructions executable by packet processor 24A.

Clients 63A receive data 25, 27 from applications, the data 25, 27 representing control processing operations, and translate data 25, 27 to nodes 30A that platform manager 64A and server 65A push to driver 60A to configure forwarding path 66A. Clients 63A may represent an interface adapter, e.g., a P4, OpenFlow, Switch Abstraction Interface (SAI), or other software-defined networking (SDN) protocol interface adapter that receives operations on the corresponding interface with a controller or the third-party application 15 and translates the operations to nodes 30A using the server 65A API. Clients 63A push nodes 30A to server 65A, which configures the corresponding forwarding path elements 32A in forwarding path 66A using driver 60A.

In some cases, client 63A may adjust a parameter (e.g., a policer parameter changed in the configuration) or change a dependency (e.g., point a route prefix to a different next hop) for a node. Server 65A may consider nodes and entries immutable (i.e., unchangeable) once configured in the forwarding path 66A. Accordingly, to change the node, client 63A inserts a new node with the same token value as the node being "modified." Server 65A receives the new node, deletes the forwarding path element corresponding to the old node from forwarding path 66A, inserts a new forwarding path element corresponding to the new node in forwarding path 66A, regenerates any underlying hardware state, and updates any dependencies in dependencies 77A and among forwarding path elements 32A. As a result of the server 65A providing this service, the client 63A need only insert the new, updated node.

Server 65A may facilitate the programming of forwarding path elements 32A in the event that forwarding unit 2A is unable to route at least one packet of a plurality of packets. Since each of servers 65 maintains one of a plurality of dependencies data structures 77, server 65A may reprogram each forwarding path element of a plurality of forwarding path elements 32A according to dependencies data structure 77A.

In some cases, a packet may arrive at ingress interface 35, and forwarding path elements 32A may be unable to process the packet from ingress interface 35 to egress interface 37. In this example, packet processor 24A is offline. Packet processor 24A may come back online after it is offline. In this instance, server 65A of forwarding manager 16A may detect that packet processor 24A is available for processing packets for forwarding, and server 65A may program hardware forwarding path elements 32A to restore forwarding path 66A within packet processor 24A to normal operation. Server 65A may program forwarding path elements 32A with no direction from control unit 12 of network device 10 via server 63A. For instance, server 65A may store dependencies data structure 77A, providing a basis for programming packet processor 24A without the input of control unit 12. Server 65A of forwarding manager 16A may be configured to use dependencies data structure 77A to program forwarding path elements 32 in order from the forwarding path element closest to the point of egress of packet processor 24A to the forwarding path element closest to the point of ingress of packet processor 24A. After server 65A programs each hardware forwarding path element of the plurality of forwarding path elements 32A, packet processor 24A may resume its function of processing one or more packets.

In one example, forwarding manager 16A may be configured to maintain active registry 67A-67N ("active registry 67") that indicates whether each of packet processors 24 is available to process packets for forwarding (e.g., is online). In some examples, active registry 67 may include a bit of state for each packet processor 24. Therefore, in an example in which network device 10 includes 64 packet processors, the active registry may include 64 bits of data (e.g. a "64-bit mask"). Forwarding manager 16A may store active registry 67A. In this example, forwarding manager 16 detects that at least one packet processor 24 has become available for processing packets for forwarding. Detecting that at least one packet processor 24 has become available for processing packets for forwarding may include forwarding manager 16 detecting based on detecting a change to the active registry, e.g., a value of one or more bits changing from zero to one. Detecting the change in the active registry may cause server 65 of forwarding manager 16 to program forwarding path elements 32 of at least one packet processor 24 based on dependencies data structures 77.

Control unit 12 may transfer nodes 30 to server 65 via clients 63 through the control processing operations. In some examples, each node may include a bit mask that identifies those forwarding path elements 32 of packet processors 24 corresponding to the node, i.e., those packet processors 24 for which the forwarding path elements are present in at least one forwarding path. Each bit may include a "1" value or a "0" value, and a "1" value may signify that a forwarding path element 32 of packet processor 24 corresponds to the node, while a "0" value may signify that a packet processor 24 does not correspond to the node. In some cases, the bit mask of a node 30 indicates that the node corresponds to forwarding path elements of every packet processor 24. In other cases, the bit mask of a node 30 indicates that the node corresponds to forwarding path elements of a specific group (subset) of packet processors 24, or a single one of packet processors 24. Every time a node 30 is written to server 65, the bit mask of the node 30 is cross-referenced with active registry 67. For example, forwarding manager 100 may perform a logical AND operation of the bit masks of each node with the bit mask of active registry 67, such as after detecting a change in active registry 67, before programming a newly active packet processor, to determine which nodes and forwarding path elements need to be programmed to the newly active packet processor. For example, active registry 67 may indicate the online state of each packet processor 24, and only those forwarding path elements associated with nodes 60 for those packet processors 24 that active registry 67 identifies as online will be programmed.

In many cases, clients 63 do not change the bit mask of nodes 30 written to servers 63 through control processing operations. In some cases where the node applies to forwarding path elements of a specific group of packet processors 24, clients 63 may change or set the bit mask. Examples of some nodes that apply to a specific group of packet processors may include outbound next hops, multicast interfaces, and incoming interfaces.

A change in an active registry 67 may alert forwarding manager 16 that one or more packet processors 24 are back online. If forwarding manager 16 detects a change in active registry 67 (and in some cases, it may be forwarding manager 16 that updates active registry 67), server 65 may cease processing instructions and other configuration data from control unit 12 via internal communication link 28, and begin programming forwarding path elements 32. In another example, forwarding manager 16 may receive an error signal indicating that packet processor 24 is unable to route one or more packets, which may cause server 65 to program forwarding path elements 32. In some examples, another type of external stimulus or another signal may notify forwarding manager 16 that packet processor 24 of forwarding unit 20 is unable to route one or more packets, which may initiate the programming of forwarding path elements 32.

Figure 3:
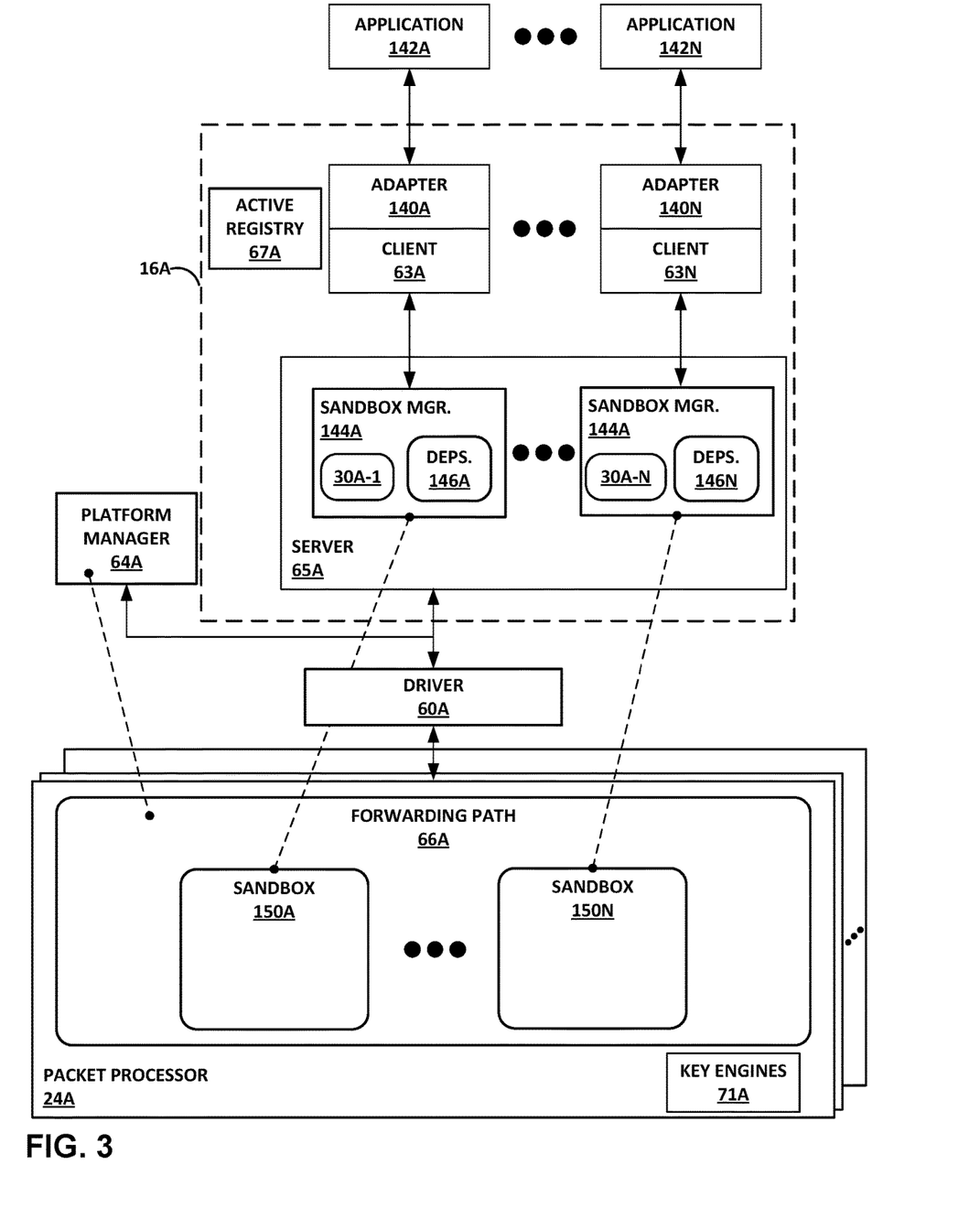
FIG. 3 is a block diagram illustrating aspects of a network device data plane having a forwarding path sandbox configured in accordance with techniques described in this disclosure.

FIG. 3 is a block diagram illustrating selected components for example implementation of a network device, according to techniques described herein. In the example of FIG. 3, forwarding manager 16A and forwarding path 66A support multiple sandboxes 150A-150N for respective applications 142A-142N, which may represent any of daemons 14 or third-party application of FIG. 1. Sandboxes are described in U.S. patent application Ser. No. 14/944,113, filed Nov. 17, 2015, and entitled "Network Device Data Plane Sandboxes for Third-party Controlled Packet Forwarding Paths," which is incorporated by reference herein in its entirety.

Packet processors 24 may each be configured with one or more sandboxes 150. Each of packet processors 24 may facilitate similar and concurrent sandbox functionality with respect to the techniques of this disclosure, said functionality being described hereinafter primarily with respect to packet processor 24A.

Sandboxes 150 represent independent, parallel, and asynchronous forwarding path logic for packet processor 24A that is exposed for configuration by applications 142 via forwarding manager 16A. While the overall forwarding path for packet processor 24A is managed and configured by native applications, e.g., daemon 14, using platform manager 64A, the native applications may configure sandboxes 150 such that configuration of the sandbox forwarding logic within the overall forwarding path 66 is delegated to other applications 142.

Sandbox 150A, for instance, represents a container for instructions to be configured inline with other forwarding path elements of the internal forwarding path 66A for packet processor 24A. In some examples, sandbox 150A is a "logical" container in that instructions are "inside" sandbox 150A if configured by server 65A to be within sandbox 150A as part of the internal forwarding path for packet processor 24A. Sandbox 150A may in such examples present to the application 142A an independent, isolated, virtual packet processor within the packet processor 24A in such a way that the application 142A has control of operations performed by the sandbox 150A logic within the established confines of the sandbox 150A.

In other examples, sandbox 150A may represent a physically separate packet processor in the form of forwarding logic physically separate from the main packet processor 24A and from forwarding path 66A. In such examples, sandbox 150A may read instructions from a physically separate memory that defines the forwarding path for sandbox 150A. Sandbox 150A may in such examples present to the application 142A an independent, isolated, packet processor inline with the forwarding path 66A for the packet processor 24A in such a way that the third party has complete control of operations performed by the sandbox 150A logic within the physically separate confines of the sandbox 150A. Although described above with respect to sandbox 150A, other sandboxes 150 may be configured and operate similarly. Although forwarding path 66A is illustrated as being executed by packet processor 24A, multiple packet processors 24 may execute a common forwarding path or a forwarding path having forwarding path elements in common. The packet processors 24 may be located on a single line card.

In this example, each of applications 142 connects with and sends data representing control processing operations to a corresponding one of adapters 140 of forwarding manager 16A. In this respect, forwarding manager 16A presents a sandbox interface. Adapter 140A, e.g., receives the control processing operations from application 142A and translates the control processing operations into nodes 30A-1. Likewise, adapter 140N receives the control processing operations from application 142N and translates the control processing operations into nodes 30A-N. Clients 63A-63N use the server 65A APIs to push nodes 30A-1-30A-N to server 65A and, more specifically, to respective sandbox managers 144A-144N. Clients 63 may by executed concurrently by respective threads to concurrently receive control processing operations from applications 142.

Clients 63 may allocate memory and build nodes using the server 65A APIs, but clients 63 allocate nodes out of different memory zones. By exploiting the parallelism enabled by the node-based configuration scheme provided by server 65A, and because the clients 63 operate independently to configure respective sandboxes 150, the clients 63 are not dependent on each other and can run concurrently. Accordingly, each of clients 63 may communicate independently with a separate one of sandbox managers 144 that themselves can each execute by a different execution thread. As a result, server 65A allows for simultaneously configuring multiple sandboxes 150.

Sandbox managers 144 may be executed by different threads to independently manage nodes and dependencies for corresponding clients 63. For example, sandbox manager 144A receives node 30A-1 from client 63A and generates dependencies 146A, which may be similar to dependencies 77A of FIG. 2. Each of sandbox managers 144 manages a separate token space for tokens of the corresponding nodes 30A for the sandbox managers. For example, tokens for nodes 30A-1 may overlap with tokens for nodes 30A-N. Servers 65 may therefore operate to provide, to different applications 142, a consistent model for interacting with the underlying packet processor 24 hardware.

Each of nodes 30A-1-30A-N ("nodes 30A") may include a bit mask identifying the elements of sandboxes 150 corresponding to nodes 30A. Each time an application 142 transfers a node 30A to server 65A via client 63A, the bit mask of the node 30A is cross-referenced with active registry 67A. Active registry 67A also contains bits of data, however active registry 67A includes a bit indicating the online state of packet processor 24A. Node 30A may be applied to sandboxes 150 if active registry 67A indicates that packet processor 24A is online.

Figure 4A:
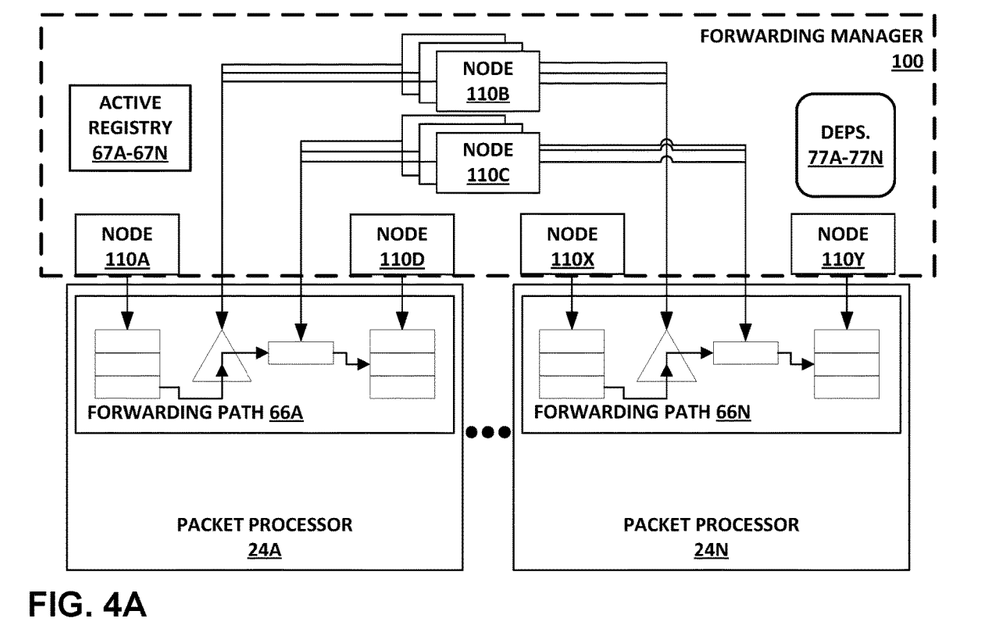
FIGS. 4A-4C are block diagrams illustrating the method of programming the elements of a forwarding path.
Figure 4B:
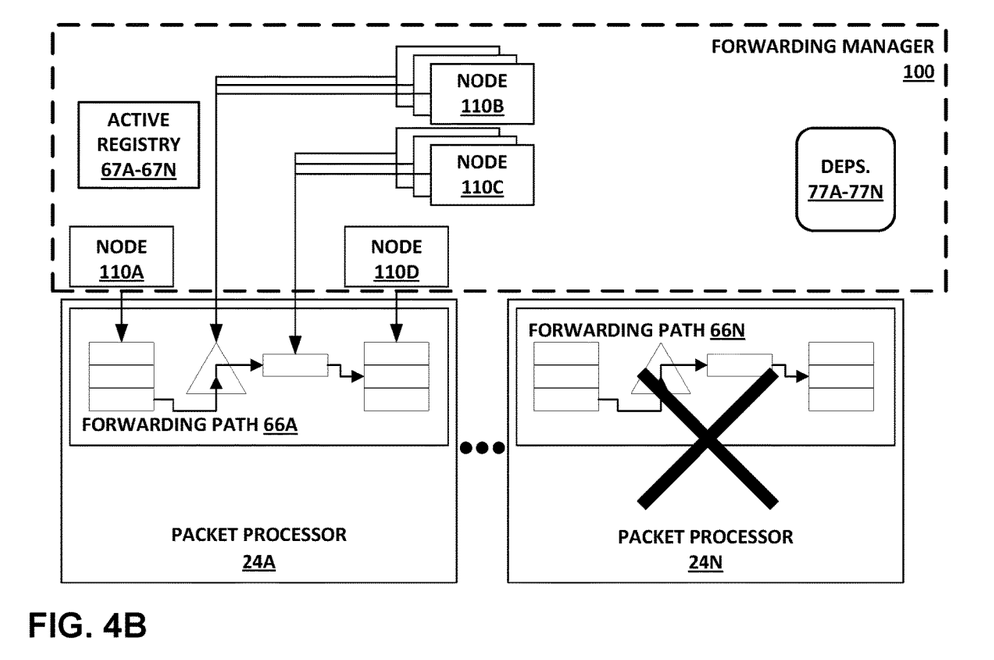
Figure 4C:
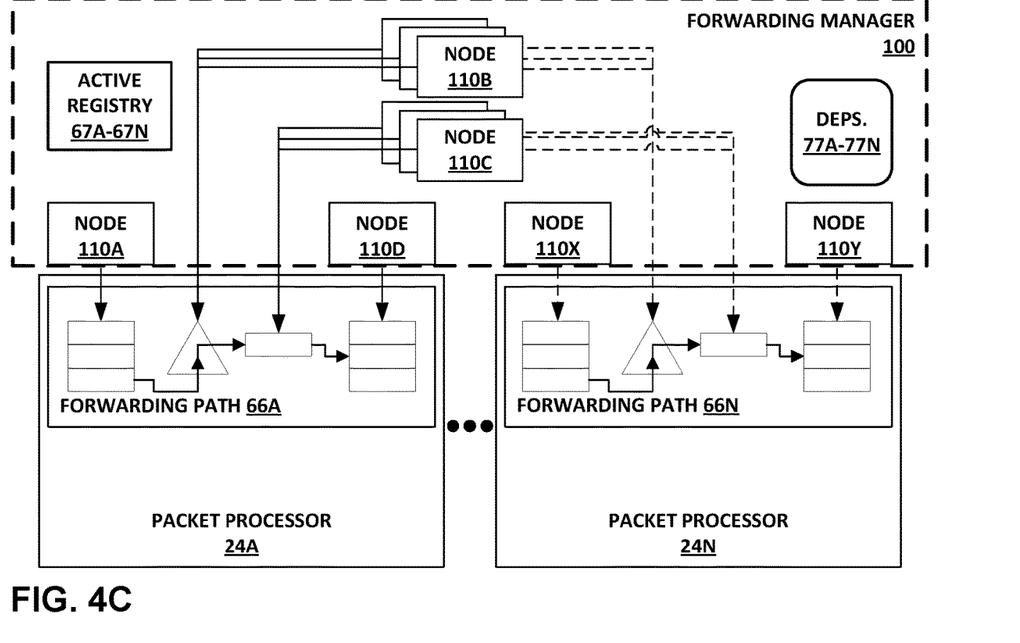

FIGS. 4A-4C are block diagrams illustrating the method of programming the elements of a forwarding path. Forwarding manager 100 may be an example of forwarding managers 16A-16N of FIG. 1. Nodes 110 may be an example of element nodes 30A-30N of FIG. 1. Although FIGS. 4A-4C depict each forwarding path 66 corresponding to four nodes, in some examples, each forwarding path 66 may correspond to more than four nodes.

Forwarding paths 66A-66N may each include a plurality of forwarding path elements, and each forwarding path element may correspond to a node 110 of forwarding manager 100, as illustrated in FIG. 4A. The dependencies of the forwarding path elements are in turn recorded in tokens (not pictured in FIGS. 4A-4C) of nodes 110A-110Y Forwarding manager 100 may be configured to create dependencies data structures 77A-77N based on the tokens of nodes 110. Dependencies data structures 77 can be updated in real time throughout the life of packet processors 24A-24N to reflect an accurate and current account of the dependencies of the nodes 110 and corresponding forwarding path elements of forwarding paths 66. When a packet processor 24 is brought online after a period of being offline, as shown in FIG. 4B, the connections between nodes 110 and forwarding path elements have been severed, and the dependencies of the forwarding path elements are not programmed. This state disrupts the operation of packet processor 24N, preventing forwarding path 66N from performing the function of routing one or more packets from a point of ingress to a point of egress.

Forwarding manager 100 may receive an indication that packet processor 24N has come online, as illustrated in FIG. 4B. For example, one of the processes running on the forwarding unit may provide the indication to the forwarding manager, such as in response to a configuration command received from a management interface 57 (FIG. 2) of the network device (e.g., a command to bring one or more packet processors online after they were 'turned off'), or a process detecting insertion of a packet interface concentrator (PIC) having associated packet processors. Forwarding manager 100 or another process may update active registry 67N to reflect the indication. Forwarding manager 100 may detect the change to active registry 67N, and begin the process of programming forwarding path elements of forwarding path 66N of the packet processor 24N that has come online. In response to the change in active registry 67N, forwarding manager 100 may cease processing requests from the control unit (e.g., received via clients 63A (FIG. 2)), and access dependencies data structure 77N to program the forwarding path elements of forwarding path 66N. Since dependencies data structures 77 are located within forwarding manager 100, forwarding paths 66 may be programmed without direction from the control unit of the network device (not pictured in FIGS. 4A-4C). This feature may allow for continuous operation of the network device. For example, while one or more forwarding paths are offline or being programmed, operational forwarding paths may continue to process packets. Therefore, the dependencies data structures 77 of forwarding manager 100 may greatly decrease the probability that the entire network device is unable to process packets during a period of time.

In some examples, nodes 110 may include common nodes and exclusive nodes. Common nodes may correspond to multiple packet processors of the plurality of packet processors 24. Examples of common nodes in FIGS. 4A-4C may include node 110B and node 110C, because these nodes are common to forwarding paths of multiple packet processors, namely packet processor 24A and packet processor 24B. Exclusive nodes are those that correspond to only a single packet processor of the plurality of packet processors 24. In the example of FIGS. 4A-4C, exclusive nodes include node 110A and node 110D. Common nodes may be more numerous than exclusive nodes, and common nodes may more likely be found in the center of forwarding paths 66A-66N, rather than at the point of ingress and the point of egress of forwarding paths 66. In some cases, exclusive nodes may represent physical interfaces that exist only on a particular packet processor or only on a particular group of packet processors, but not on all packet processors. Some examples of exclusive nodes may represent forwarding path elements such as outbound next hops, incoming interfaces, and multicast interfaces. In some cases, multicast interfaces may be represented by common nodes.

In one example, such as in FIG. 4C, in response to detecting that packet processor 24N has come online, forwarding manager 100 may program all the common nodes and all the exclusive nodes based on dependencies data structures 77. Forwarding manager 100 may traverse dependencies of dependencies data structure 77A backwards from egress to ingress, and forwarding manager 100 may sequentially program each forwarding path element of forwarding path 66N from the element closest to the point of egress to the element closest to the point of ingress. For example, exclusive nodes corresponding to offline packet processor 24N, such as nodes 100X and 100Y, may be dormant while packet processor 24N is offline (as illustrated in FIG. 4B). However, once packet processor 24N is back online, forwarding manager 100 may program each forwarding path element in order starting with the forwarding path element corresponding to node 110Y, followed by the forwarding path element corresponding to node 110C, followed by the forwarding path element corresponding to node 110B, and finally the forwarding path element corresponding to node 110X.

In some examples, in traversing the dependencies data structure 77A, forwarding manager 100 may determine whether a given forwarding path element is relevant to the forwarding path, i.e., whether the node should be programmed to forwarding path 66N, based on whether the bit mask stored by the node for that forwarding path element indicates that the forwarding path element is used by packet processor 24N. While forwarding manager 100 is traversing dependencies data structure 77A for programming forwarding path 66N, other active packet processors, e.g., packet processors 24A-24(N-1), continue processing incoming packets using the respective forwarding paths 66A-66(N-1). The respective forwarding paths 66A-66(N-1) may include slightly stale data during this time, because server 65A (FIG. 2) of forwarding manager 100 has temporarily stopped execution of control processing operations received from control unit 12 via client(s) 63A. When forwarding manager 100 has finished traversing dependencies data structure 77A and programming forwarding path 66N, server 65A resumes execution of control processing operations received from control unit 12 via client(s) 63A. Packet processor 24N also begins processing packets using the newly programmed forwarding path 66N.

Figure 5:
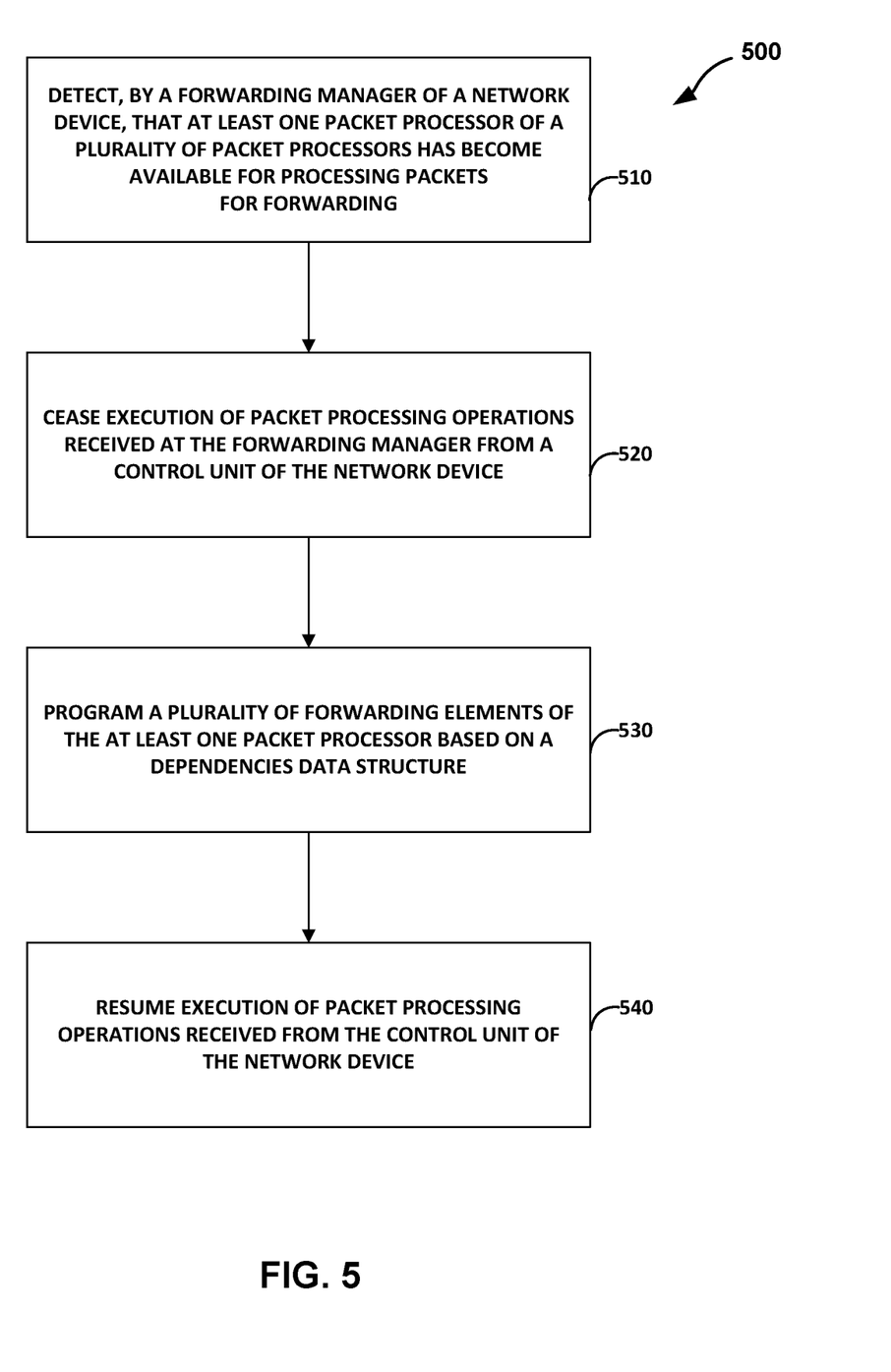
FIG. 5 is a flowchart illustrating an example mode of operation for a network device for programming one or more packet processors.

FIG. 5 is a flowchart illustrating an example mode of operation for a network device for programming one or more packet processors, in accordance with techniques described in this disclosure. Mode of operation 500 is described with respect to forwarding manager 16 of network device 10 of FIG. 1 but may be executed by any forwarding unit processor that executes instructions to configure at least one packet processor for a line card.

Forwarding manager 16A of network device 10 may detect that at least one packet processor 24A has become available for processing packets for forwarding (510). In response to detecting that at least one packet processor 24A has become available for processing packets for forwarding, forwarding manager 16A may cease execution of control processing operations received at forwarding manager 16A from control unit 12 of network device 10 (520). For example, server 65A may pause in executing control processing operations received from client(s) 63A (FIG. 2). Subsequent to ceasing the execution of control processing operations, forwarding manager 16A may program a plurality of forwarding path elements 32A of the at least one packet processor 24A based on dependencies data structure 77A (530). For example, forwarding manager 16A may program the plurality of forwarding path elements 32A in an order from egress to ingress according to dependencies indicated by dependencies data structure 77A, such as based on nodes in the dependencies data structure 77A and the dependencies reflected in the nodes' tokens. After forwarding manager 16A has programmed the forwarding path elements 32A, forwarding manager 16A may resume executing control processing operations received from control unit 12 of network device 10 (540). For example, server 65A may continue executing control processing operations received from client(s) 63A. Packet processor 24N also begins processing packets using the newly programmed forwarding path 66N.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a non-transitory computer-readable medium or computer-readable storage medium, containing instructions. Instructions embedded or encoded in a computer-readable medium may cause a programmable processor, or other processor, to perform the method, e.g., when the instructions are executed. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer-readable storage media. The term "computer-readable storage media" refers to physical storage media, and not signals or carrier waves, although the term "computer-readable media" may include transient media such as signals, in addition to physical storage media.

What is claimed is:

1. A method comprising:
   detecting, by a forwarding manager for an internal forwarding path executed by at least one packet processor of a forwarding unit of a network device, that the at least one packet processor of a plurality of packet processors has become available for processing packets for forwarding, wherein the forwarding unit comprises the forwarding manager;
   in response to the detecting, ceasing, by the forwarding manager, translation of data representing control processing operations received from a control unit of the network device;
   programming, by the forwarding manager, a plurality of forwarding path elements of the at least one packet processor based on a dependencies data structure, wherein the dependencies data structure comprises one or more dependencies that each indicates, for a node of a plurality of nodes, one or more nodes that reference the node, and wherein each node of the plurality of nodes corresponds to a single forwarding path element of the plurality of forwarding path elements; and
   subsequent to programming the plurality of forwarding path elements of the at least one packet processor, resuming, by the forwarding manager, translation of the data representing control processing operations received from the control unit of the network device.

2. The method of claim 1, further comprising:
   receiving, by a server module of the network device, the control processing operations from the control unit of the network device; and
   creating, by the server module, the dependencies data structure based on the control processing operations.

3. The method of claim 1, further comprising:
   maintaining an active registry that indicates whether each packet processor of a plurality of packet processors is available to process packets for forwarding,
   wherein the detecting comprises detecting based on detecting a change to the active registry.

4. The method of claim 1, wherein the programming comprises consecutively programming each forwarding path element of the plurality of forwarding path elements in order from an egress forwarding path element to an ingress forwarding path element.

5. The method of claim 1, further comprising:
subsequent to programming the at least one packet processor, forwarding the packets by the at least one packet processor based on the plurality of forwarding path elements.

6. The method of claim 1, further comprising:
while programming the plurality of forwarding path elements, forwarding, by one or more other packet processors of the plurality of packet processors, a plurality of packets.

7. The method of claim 1, wherein each forwarding path element of the plurality of forwarding path elements comprises at least one instruction executable by the at least one packet processor.

8. The method of claim 1, wherein each forwarding path element of the plurality of forwarding path elements comprises one of a lookup tree, a lookup table, a rate limiter, a policer, and a counter.

9. The method of claim 1, further comprising:
generating, by the forwarding manager based on the control processing operations, a plurality of nodes; and
configuring, by the forwarding manager based on the nodes, a forwarding path comprising the plurality of forwarding path elements.

10. The method of claim 9, wherein the nodes comprise:
one or more common nodes, wherein the one or more common nodes correspond to the plurality of forwarding path elements of multiple packet processors of the plurality of packet processors; and
one or more exclusive nodes, wherein the one or more exclusive nodes correspond to the plurality of forwarding path elements of the one packet processor of the plurality of packet processors.

11. A network device comprising:
a control unit;
a forwarding unit of a plurality of forwarding units comprising:
a forwarding manager; and
a packet processor, wherein the packet processor comprises a plurality of forwarding path elements; and
wherein the forwarding manager is configured to:
detect that the packet processor has become available for processing packets for forwarding,
cease translation of data representing control processing operations received from the control unit in response to detecting that the packet processor has become available for processing packets for forwarding,
program the plurality of forwarding path elements of the packet processor based on a dependencies data structure, wherein the dependencies data structure comprises one or more dependencies that each indicates, for a node of a plurality of nodes, one or more nodes that reference the node, and wherein each node of the plurality of nodes corresponds to a single forwarding path element of the plurality of forwarding path elements; and
subsequent to programming the plurality of forwarding path elements of the packet processor, resume translation of the data representing control processing operations received from the control unit of the network device.

12. The network device of claim 11, wherein the forwarding unit further comprises:
a server module, wherein the server module is configured to:
receive the control processing operations from the control unit of the network device; and
create the dependencies data structure based on the control processing operations.

13. The network device of claim 11, wherein the forwarding manager is further configured to:
maintain an active registry configured to indicate whether the packet processor is available to process packets for forwarding;
wherein detecting that the packet processor is available to process packets for forwarding comprises detecting based on detecting a change to the active registry.

14. The network device of claim 11, wherein the forwarding manager is further configured to program each forwarding path element of the plurality of forwarding path elements in order from an egress forwarding path element to an ingress forwarding path element.

15. The network device of claim 11, wherein the packet processor is configured to forward the packets based on the plurality of forwarding path elements subsequent to programming the plurality of forwarding path elements.

16. The network device of claim 11, wherein the network device is configured to forward, by one or more packet processors of one or more other forwarding units, a plurality of packets while programming the plurality of forwarding path elements of the packet processor.

17. The network device of claim 11, wherein each forwarding path element of the plurality of forwarding path elements comprises at least one instruction executable by the packet processor.

18. The network device of claim 11, wherein each forwarding path element of the plurality of forwarding path elements comprises one of a lookup tree, a lookup table, a rate limiter, a policer, and a counter.

19. The network device of claim 11, wherein the forwarding unit comprises a line card insertable within a chassis of the network device.

20. A non-transitory computer-readable medium comprising instructions for causing one or more programmable processors of a network device to:
detect, by a forwarding manager for an internal forwarding path executed by at least one packet processor of a forwarding unit of the network device, that the at least one packet processor of a plurality of packet processors has become available for processing packets for forwarding;
in response to detecting that the at least one packet processor has become available for processing packets for forwarding, cease, by the forwarding manager, translation of data representing control processing operations received from a control unit of the network device;
program, by the forwarding manager, a plurality of forwarding path elements of the at least one packet processor based on a dependencies data structure, wherein the dependencies data structure comprises one or more dependencies that each indicates, for a node of a plurality of nodes, one or more nodes that reference the node, and wherein each node of the plurality of nodes corresponds to a single forwarding path element of the plurality of forwarding path elements; and
subsequent to programming the plurality of forwarding path elements of the packet processor, resume, by the forwarding manager, translation of the data representing control processing operations received from the control unit of the network device.

* * * * *